US011429143B2

(12) United States Patent
Boisard et al.

(10) Patent No.: US 11,429,143 B2
(45) Date of Patent: Aug. 30, 2022

(54) NARROW BORDER PLASTIC COVER WITH OPTIMAL OPTOMECHANICAL PROPERTIES

(71) Applicant: Dell Products L.P., Round Rock, TX (US)

(72) Inventors: Tifenn Boisard, Cedar Park, TX (US); Deeder Aurongzeb, Austin, TX (US); Brian Yates, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 432 days.

(21) Appl. No.: 16/791,242

(22) Filed: Feb. 14, 2020

(65) Prior Publication Data

US 2020/0183444 A1 Jun. 11, 2020

Related U.S. Application Data

(62) Division of application No. 15/411,746, filed on Jan. 20, 2017, now Pat. No. 10,664,009.

(51) Int. Cl.
*G06F 1/16* (2006.01)
*G02B 1/10* (2015.01)
(Continued)

(52) U.S. Cl.
CPC .......... *G06F 1/1601* (2013.01); *B32B 27/365* (2013.01); *G02B 1/10* (2013.01);
(Continued)

(58) Field of Classification Search
CPC .... G06F 1/1637; G06F 1/1601; G06F 1/1626; G02F 1/133308; G02F 1/133502;
(Continued)

(56) References Cited

U.S. PATENT DOCUMENTS 8,780,539 B2 *   7/2014  Raff ...................... G06F 1/1633
                                                             361/679.55
9,454,038 B2 *   9/2016  Jeon ..................... G02B 6/0081
(Continued)

FOREIGN PATENT DOCUMENTS

WO           2016/140457          9/2016

OTHER PUBLICATIONS

Nicole Lavoie, "Innovations in Hybrid Structural Instant Adhesive Technologies," Henkel Corporation, Feb. 2016; 7 pages.

*Primary Examiner* — Vinh T Lam
(74) *Attorney, Agent, or Firm* — Baker Botts, L.L.P.

(57) ABSTRACT

Methods for assembling a narrow border plastic cover include defining a center portion and an edge portion of a plastic cover. A hard coat treatment may be applied to the center portion of the plastic cover to improve anti-glare and anti-scratch properties and mechanical strength while retaining the flexibility of the plastic cover at the edge portion. An optically clear adhesive may be applied to the plastic cover to improve the durability and bond strength of the bond between the narrow border plastic cover and a display. A structural adhesive may be applied to an edge portion of the display to improve the mechanical strength at the edge portion of the plastic cover when bonded to the display. The narrow border plastic cover may be bonded to the display to improve the ability of the display to absorb impacts.

10 Claims, 7 Drawing Sheets

(51) Int. Cl.
  *G02B 1/14* (2015.01)
  *G02F 1/1335* (2006.01)
  *B32B 27/36* (2006.01)
  *G02F 1/1333* (2006.01)
(52) U.S. Cl.
  CPC ......... *G02B 1/14* (2015.01); *G02F 1/133308* (2013.01); *G02F 1/133502* (2013.01); *G06F 1/1626* (2013.01); *G06F 1/1637* (2013.01); *B32B 2457/20* (2013.01); *B32B 2457/202* (2013.01); *B32B 2457/206* (2013.01); *C09K 2323/05* (2020.08); *C09K 2323/055* (2020.08); *G02F 1/13332* (2021.01); *G02F 1/133331* (2021.01); *G02F 1/133388* (2021.01)
(58) Field of Classification Search
  CPC ........... G02F 1/13332; G02F 1/133331; G02F 1/133388; G02B 1/10; G02B 1/14; B32B 27/365; B32B 2457/20; B32B 2457/202; B32B 2457/206; C09K 2323/055; C09K 2323/05
  See application file for complete search history.

(56) References Cited

U.S. PATENT DOCUMENTS

| | | | | |
|---|---|---|---|---|
| 9,550,335 | B2* | 1/2017 | Cole | G06F 1/169 |
| 9,650,546 | B2* | 5/2017 | Yamamoto | B32B 27/34 |
| 9,741,971 | B2* | 8/2017 | Lee | H01L 51/003 |
| 9,927,643 | B2* | 3/2018 | Kim | G02F 1/133528 |
| 9,974,197 | B2* | 5/2018 | Song | G02F 1/133308 |
| 9,974,199 | B2* | 5/2018 | Allore | G06F 1/1637 |
| 10,019,029 | B1* | 7/2018 | Yu | G06F 1/1635 |
| 10,025,126 | B2* | 7/2018 | Son | G02F 1/133308 |
| 10,133,107 | B2* | 11/2018 | Hu | G06F 1/1601 |
| 10,168,743 | B2* | 1/2019 | Kuo | G06F 1/1643 |
| 10,248,158 | B2* | 4/2019 | Sullivan | G06F 1/1607 |
| 10,288,973 | B1* | 5/2019 | Gupta | G02F 1/133305 |
| 10,296,115 | B2* | 5/2019 | Lai | G06F 1/1656 |
| 10,472,277 | B2* | 11/2019 | Aurongzeb | C03C 17/42 |
| 10,571,727 | B2* | 2/2020 | Eom | G02F 1/13338 |
| 10,884,457 | B2* | 1/2021 | Hong | B32B 37/12 |
| 11,209,922 | B2* | 12/2021 | Kim | G02F 1/133308 |
| 2006/0100299 | A1 | 5/2006 | Malik et al. | |
| 2013/0335670 | A1* | 12/2013 | Huang | H05K 5/03 361/679.01 |
| 2014/0183473 | A1 | 7/2014 | Lee et al. | |
| 2014/0306941 | A1 | 10/2014 | Kim et al. | |
| 2015/0017393 | A1 | 1/2015 | Oh et al. | |
| 2016/0023943 | A1* | 1/2016 | Aurongzeb | B32B 27/40 428/192 |
| 2016/0363804 | A1* | 12/2016 | Son | G02F 1/13336 |
| 2016/0378139 | A1* | 12/2016 | Schwager | G06F 1/1626 264/274 |
| 2016/0378141 | A1* | 12/2016 | Schwager | G06F 1/1637 361/679.26 |
| 2017/0156227 | A1* | 6/2017 | Heo | H05K 5/0017 |
| 2017/0194411 | A1 | 7/2017 | Park et al. | |
| 2017/0344053 | A1* | 11/2017 | Kim | G06F 1/1637 |
| 2018/0004254 | A1* | 1/2018 | Park | G06F 1/1656 |
| 2018/0039127 | A1 | 2/2018 | Eom et al. | |

\* cited by examiner

HARDNESS TESTING RESULTS
600

| SUBSTRATE | COATING TYPE | TEST RESULTS POST ABRASION TEST | REPRESENTATION OF SCRATCHES |
|---|---|---|---|
| PMMA | AG | VERY LIGHT SCRATCHES | |
| PC | AG | VERY LIGHT SCRATCHES | |
| PMMA | EC | SCRATCHES | |
| PC | EC | SCRATCHES | |
| PMMA | NONE | SIGNIFICANT SCRATCHES | |
| PC | NONE | MOST SCRATCHES | |

FIG. 6

METHOD FOR ASSEMBLING A NARROW BORDER PLASTIC COVER FOR USE WITH A DISPLAY

700

702 — APPLYING A HARD COAT TREATMENT TO A CENTER PORTION OF A PLASTIC COVER TO FORM THE NARROW BORDER PLASTIC COVER, THE PLASTIC COVER INCLUDING THE CENTER PORTION AND AN EDGE PORTION DEFINED THEREIN, THE EDGE PORTION OUTSIDE THE CENTER PORTION

704 — APPLYING AN OPTICALLY CLEAR ADHESIVE TO THE NARROW BORDER PLASTIC COVER

706 — APPLYING A STRUCTURAL ADHESIVE TO A SECOND EDGE PORTION OF THE DISPLAY, THE DISPLAY INCLUDING A SECOND CENTER PORTION AND THE SECOND EDGE PORTION DEFINED THEREIN, THE SECOND EDGE PORTION OUTSIDE THE SECOND CENTER PORTION

708 — BONDING THE NARROW BORDER PLASTIC COVER TO THE DISPLAY

FIG. 7

NARROW BORDER PLASTIC COVER WITH OPTIMAL OPTOMECHANICAL PROPERTIES

BACKGROUND

Field of the Disclosure

This disclosure relates generally to information handling systems and, more particularly, to a narrow border plastic cover for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Advancements in packaging design have increased the size and viewable area of displays and reduced both the weight and thickness of information handling systems. In particular, components included in displays of information handling systems, such as smart televisions, desktops, laptops, notebooks, tablets, and mobile phone form factors, are the object of efforts to increase the size and viewable area of displays and reduce their weight and thickness without compromising structural strength. Specifically, display covers are rapidly becoming a primary interface between a user and an information handling system. Often referred to as a 'cover glass' because of the glass base material used, display covers are also subject to optical performance attributes, such as supporting high resolution displays, high brightness, excellent color reproduction, as well as supporting touch functionality.

As overall weight of information handling systems decreases, the weight contribution of display covers made of glass has come under increased scrutiny by product designers. Although reducing the thickness of a display cover made of glass will reduce weight, an undesirable reduction in structural rigidity may also occur with thinner display covers. Additionally, newer designs of information handling systems involving integration of various user interface elements are appearing and are affecting display cover performance. Display covers may now include features such as color bezels, protrusions, holes, or other mounting structures for buttons or other electronic devices, such as cameras and microphones. Such features may introduce localized stress concentrations that may lead to undesirable early failure of display covers, often in the form of cracks or fractures.

Accordingly, it is desirable to have an improved design and a correspondingly improved assembly method for display covers in an information handling system that yields lightweight yet sufficiently robust display covers and larger viewable areas of displays.

SUMMARY

In one aspect, a disclosed method for assembling a narrow border plastic cover for use with a display of an information handling system may include applying a hard coat treatment to a center portion of a plastic cover to form the narrow border plastic cover, the plastic cover including the center portion and an edge portion defined therein, the edge portion outside the center portion. The method may also include applying an optically clear adhesive to the narrow border plastic cover. The method may further include applying a structural adhesive to a second edge portion of the display, the display including a second center portion and the second edge portion defined therein, the second edge portion outside the second center portion. The method may also include bonding the narrow border plastic cover to the display.

In any of the disclosed embodiments of the method, where a narrow border chassis bezel may be attached to the display.

In any of the disclosed embodiments of the method, where the edge portion of the narrow border plastic cover may form a downward angle from the center portion of the narrow border plastic cover with a measure between 0 degrees and 90 degrees, and where the edge portion may be curved.

In any of the disclosed embodiments of the method, where the edge portion of the narrow border plastic cover may form an upward angle from the center portion of the narrow border plastic cover with a measure between 0 degrees and 90 degrees, and where the edge portion may be curved.

In any of the disclosed embodiments of the method, where the narrow border plastic cover may wrap around a side of the display.

In any of the disclosed embodiments of the method, where the narrow border plastic cover may include at least one of: a polymethyl methacrylate, a polycarbonate, a direct bonded substrate, a polyamide, a polybutylene terephthalate, a polyethylene terephthalate, a polyethylene naphthalene, a polyvinylidene fluoride, a poly 3-cyclohexyl thiophene, a gelatin.

In any of the disclosed embodiments of the method, wherein the hard coat treatment may include at least one of an anti-glare coating, and an epoxy conformal coating.

In any of the disclosed embodiments of the method, wherein the display may be a convex curved display.

In any of the disclosed embodiments of the method, wherein the display may be one of a convex curved display and a concave curved display.

In any of the disclosed embodiments of the method, wherein the display may be a liquid crystal monitor, a liquid crystal display, an organic light emitting diode display, and a transparent display.

In any of the disclosed embodiments of the method, a folded portion of the transparent display may be active with pixel with a top portion and a side portion of the transparent display via the narrow border plastic cover.

In another aspect, a disclosed narrow border plastic cover for use with a display of an information handling system may include a plastic cover including a center portion and an edge portion defined therein, the edge portion outside the center portion. The plastic cover may have a hard coat treatment applied to the center portion of the plastic cover to form the narrow border plastic cover. The narrow border plastic cover may have an optically clear adhesive applied. The display may have a structural adhesive applied to a second edge portion of the display, the display including a second center portion and the second edge portion defined therein, the second edge portion outside the second center portion. The narrow border plastic cover may be bonded to the display.

In any of the disclosed embodiments of the narrow border plastic cover, where a narrow border chassis bezel may be attached to the display.

In any of the disclosed embodiments of the narrow border plastic cover, where the edge portion of the narrow border plastic cover may form a downward angle from the center portion of the narrow border plastic cover with a measure between 0 degrees and 90 degrees, and where the edge portion may be curved.

In any of the disclosed embodiments of the narrow border plastic cover, where the edge portion of the narrow border plastic cover may form an upward angle from the center portion of the narrow border plastic cover with a measure between 0 degrees and 90 degrees, and where the edge portion may be curved.

In any of the disclosed embodiments of the narrow border plastic cover, where the narrow border plastic cover may wrap around a side of the display.

In any of the disclosed embodiments of the narrow border plastic cover, where the narrow border plastic cover may include at least one of: a polymethyl methacrylate, a polycarbonate, a direct bonded substrate, a polyamide, a polybutylene terephthalate, a polyethylene terephthalate, a polyethylene naphthalene, a polyvinylidene fluoride, a poly 3-cyclohexyl thiophene, a gelatin.

In any of the disclosed embodiments of the narrow border plastic cover, where the hard coat treatment may include at least one of an anti-glare coating, and an epoxy conformal coating.

In any of the disclosed embodiments of the narrow border plastic cover, where the display may be a convex curved display.

In any of the disclosed embodiments of the narrow border plastic cover, where the display may be one of a convex curved display and a concave curved display.

In any of the disclosed embodiments of the narrow border plastic cover, where the display may be a liquid crystal monitor, a liquid crystal display, an organic light emitting diode display, and a transparent display.

In any of the disclosed embodiments of the narrow border plastic cover, a folded portion of the transparent display may be active with pixel with a top portion and a side portion of the transparent display via the narrow border plastic cover.

BRIEF DESCRIPTION OF THE DRAWINGS

For a more complete understanding of the present invention and its features and advantages, reference is now made to the following description, taken in conjunction with the accompanying drawings, in which:

FIG. 6 are hardness testing results of embodiments of embodiments of narrow border plastic covers in an information handling system; and FIG. 7 is flowchart depicting selected elements of an embodiment of a method for assembling a narrow border plastic cover for use with a display of an information handling system.

DESCRIPTION OF PARTICULAR EMBODIMENT(S)

Figure 1:
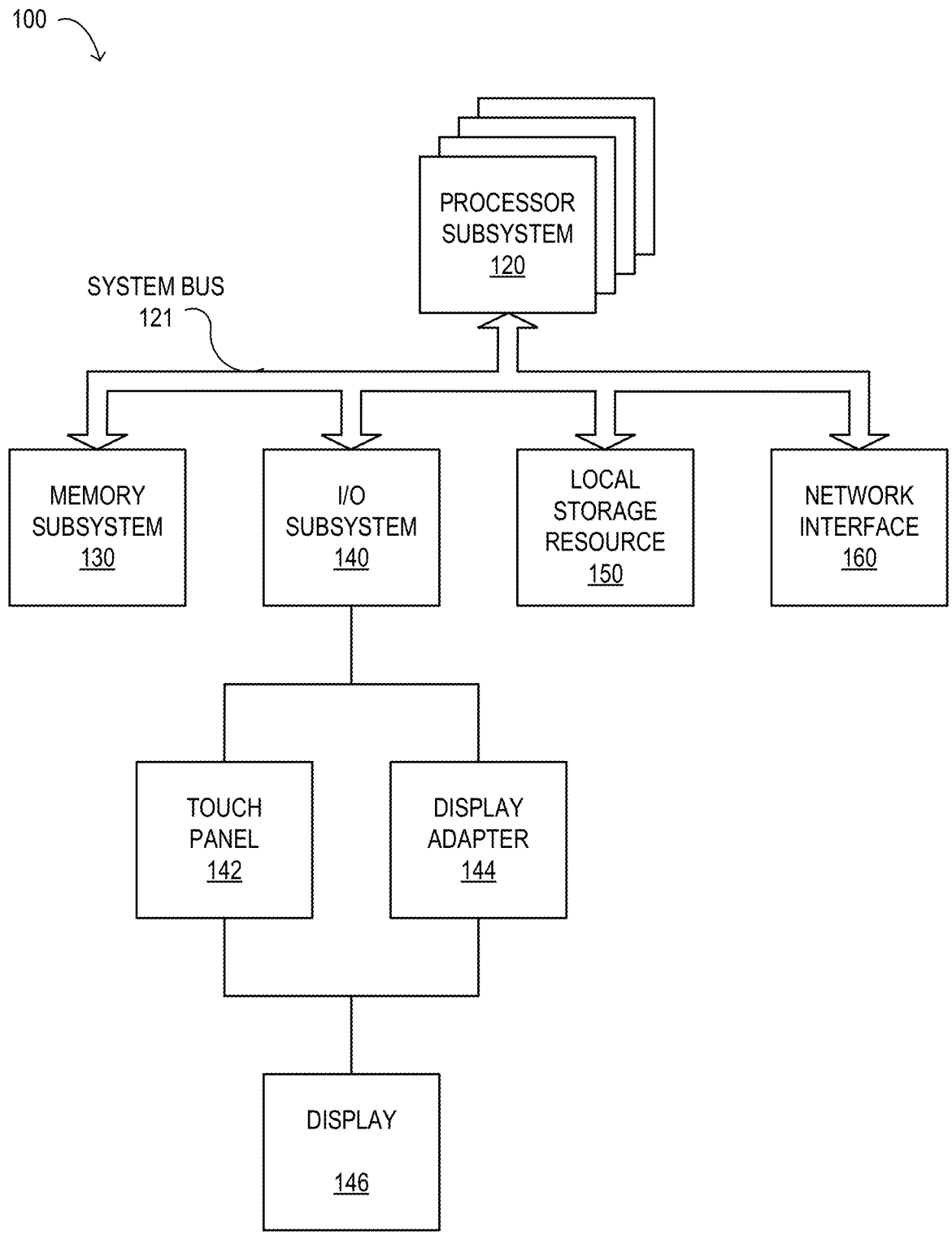
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current information handling systems may demand ever increased size and viewable area of displays and ever thinner and lighter products, without sacrificing strength and stability. In particular, larger displays including increased viewable area are being developed for information handling systems that include a display cover. As will be described in further detail, the inventors of the present disclosure have developed novel methods and structures disclosed herein for assembling a narrow border plastic cover having a flexible edge portion to allow for curved displays and a center portion hardened external surface. The disclosed narrow border plastic cover is thin and lightweight, while meeting expectations for durability and high quality.

Particular embodiments are best understood by reference to FIGS. 1 through 8 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in the network storage resource).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with display 146 that is driven by display adapter 144. As shown, display 146 may include a narrow border plastic cover, as described herein.

Figure 2:
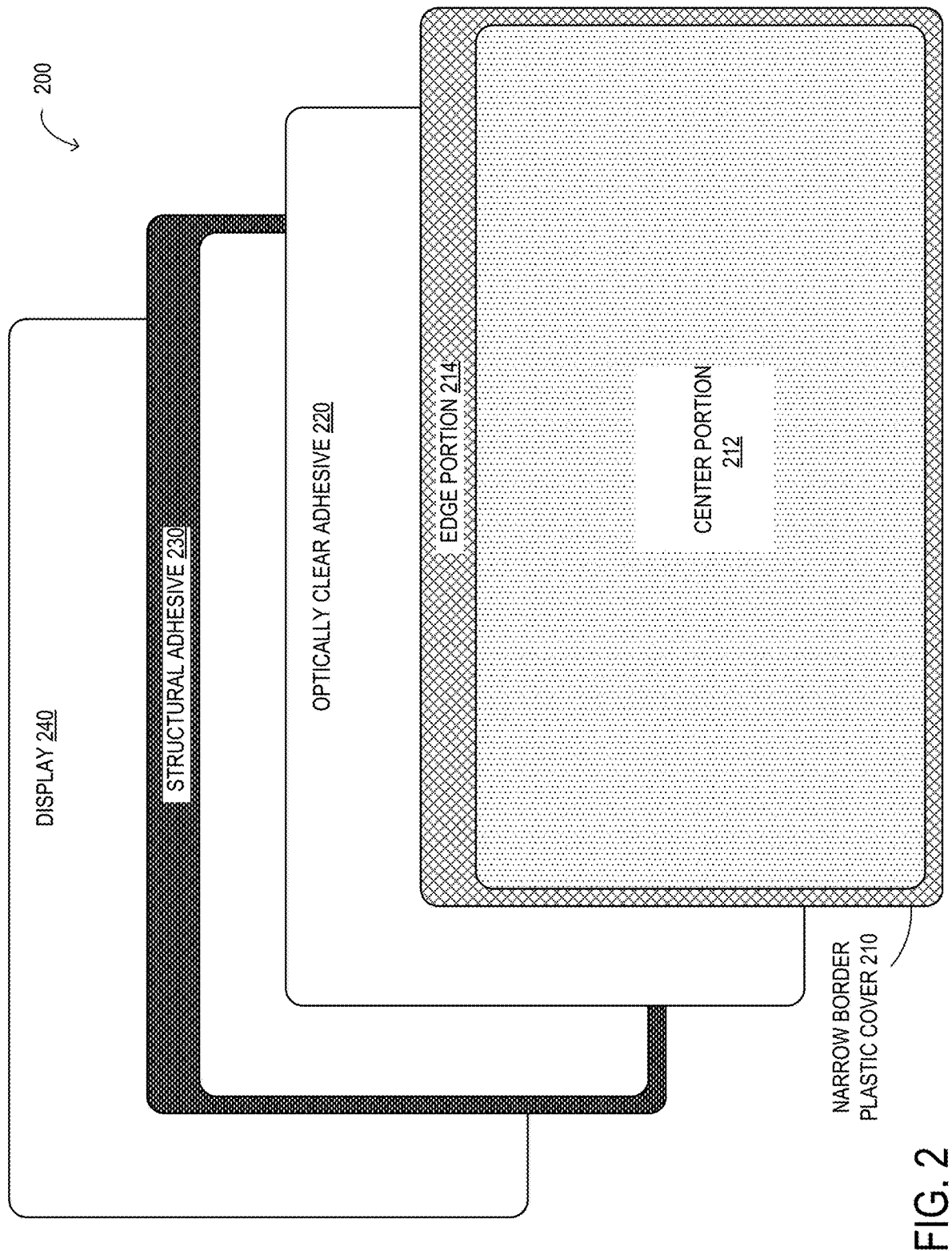
FIG. 2 is a block diagram of selected elements of an embodiment of a narrow border plastic cover for use with a display of an information handling system.

Turning now to FIG. 2, selected elements of an embodiment of a narrow border plastic cover 210 for use with a display of an information handling system 200 are illustrated. As shown, narrow border plastic cover 210 may represent various embodiments of narrow border plastic covers described herein. Narrow border plastic cover 210 includes a center portion 212 and an edge portion 214. Center portion 212 may represent a display portion through which a user views a display that narrow border plastic cover 210 is attached to. Center portion 212 may represent a face of narrow border plastic cover 210 that a user may touch. Edge portion 214 may be a band at an exterior edge of narrow border plastic cover 210, which is outside center portion 212. The display may be a display 240, which may be a liquid crystal monitor, a liquid crystal display, an organic light emitting diode display, a transparent display, among other types of displays. Display 240 may also be a flat display, a convex curved display, a concave curved display, among other shapes of displays. The transparent display may be active with pixel with a top portion and side portions of the transparent display. For example, a folded portion of the transparent display may be active with pixel with its top portion and side portions via narrow border plastic cover 210 that a user may touch.

As a result of the various desirable characteristics of a display cover, as described above, narrow border plastic cover 210 may be formed using a plastic cover that is hardened in a specific manner. The plastic cover may be made of a suitable polymer material, such as polymethyl methacrylate (PMMA), polycarbonate (PC), polyethylene terephthalate (PET), polyamide (PA), polyamide sixth pixel region (PA6 pixel), polybutylene terephthalate (PBT), polyethylene naphthalene (PEN), polyvinylidene fluoride (PVDE), poly(3-cyclohexyl thiophene) (PCHT), a direct bonded substrate, and combinations thereof, among other polymer materials. In some embodiments, the plastic cover is itself a plastic-glass composite, for example, including alternating plastic and glass layers. In particular, a hard coat treatment may be applied to center portion 212 of an exterior surface of the plastic cover to form narrow border plastic cover 210. In an example embodiment, the plastic cover may be a PMMA polymer material. The hard coat treatment may apply materials with desired optical properties for high quality display performance. One or more types of hard coatings may be applied to center portion 212 including an anti-glare (AG) coating, an epoxy conformal (EC) coating, among other types of hard coating. For purposes of the hard coat treatment, edge portion 214 may be masked to expose only center portion 212. The hard coat treatment may provide anti-glare and anti-scratch properties that are desirable for narrow border plastic cover 210.

After the hard coat treatment is applied, a hardness of center portion 212 may be higher, or substantially higher, than edge portion 214. The hardness is measured at a surface of narrow border plastic cover 210. Specifically, after the hard coat treatment is applied to center portion 212 of the plastic cover of a PMMA polymer material, the hardness of center portion 212 may be about 2H, where H is a hardness value according to the Mohs scale of mineral hardness. The higher hardness of center portion 212 may result in excellent anti-scratch properties of narrow border plastic cover 210, which is desirable. In other embodiments, after hard coat treatments are applied to a center portion 212 of the plastic cover of a PC polymer material, a Mitsubishi D5380 direct bonded substrate, and a Mitsubishi D7340 direct bonded substrate, the hardness of center portion 212 may be about 3B, HB, and F, respectively. After the hard coat treatment is applied, center portion 212 of narrow border plastic cover 210 may increase surface hardness and strength, improve shear reduction properties, and maintain reliability of narrow border plastic cover 210. Table 1, below, shows various types of candidate polymer materials of the plastic cover of narrow border plastic cover 210 and their properties after the hard coat treatment has been applied.

After the hard coat treatment is applied, the flexibility of narrow border plastic cover 210 at edge portion 214 is retained. The flexibility of narrow border plastic cover 210 at edge portion 214 may allow edge portion 214 to be stretched or pulled from center portion 212 to form a curve with an angle of the curve having a measure between 0 degrees and 90 degrees, where the curve may be a convex curve or a concave curve. Narrow border plastic cover 210 may be used with a flat or a curved display 240. The flexibility of narrow border plastic cover 210 at edge portion 214, may also allow narrow border plastic cover 210 to wrap around a side of display 240.

After the hard coat treatment is applied, an optically clear adhesive 220 may be applied to the other exterior surface of narrow border plastic cover 210. Optically clear adhesive 220 may include materials to improve bond strength and durability. After optically clear adhesive 220 is applied, a structural adhesive 230 may be applied to an edge portion of display 240. Structural adhesive 230 may include materials to improve mechanical strength at the edge portion of the narrow border plastic cover 210. Structural adhesive 230 may be a standard structural adhesive and may have high viscosity to improve bonding of narrow border plastic cover 210 to display 240. Structural adhesive 230 may be ultraviolet curable, ambient temperature curable, high temperature curable, among other curable processes. After structural adhesive 230 is applied, narrow border plastic cover 210 may be bonded to display 240. Narrow border plastic cover 210 bonded to display 240 may improve their ability to absorb impacts. In one or more embodiments, a narrow border chassis bezel may be attached to display 240.

Figure 3:
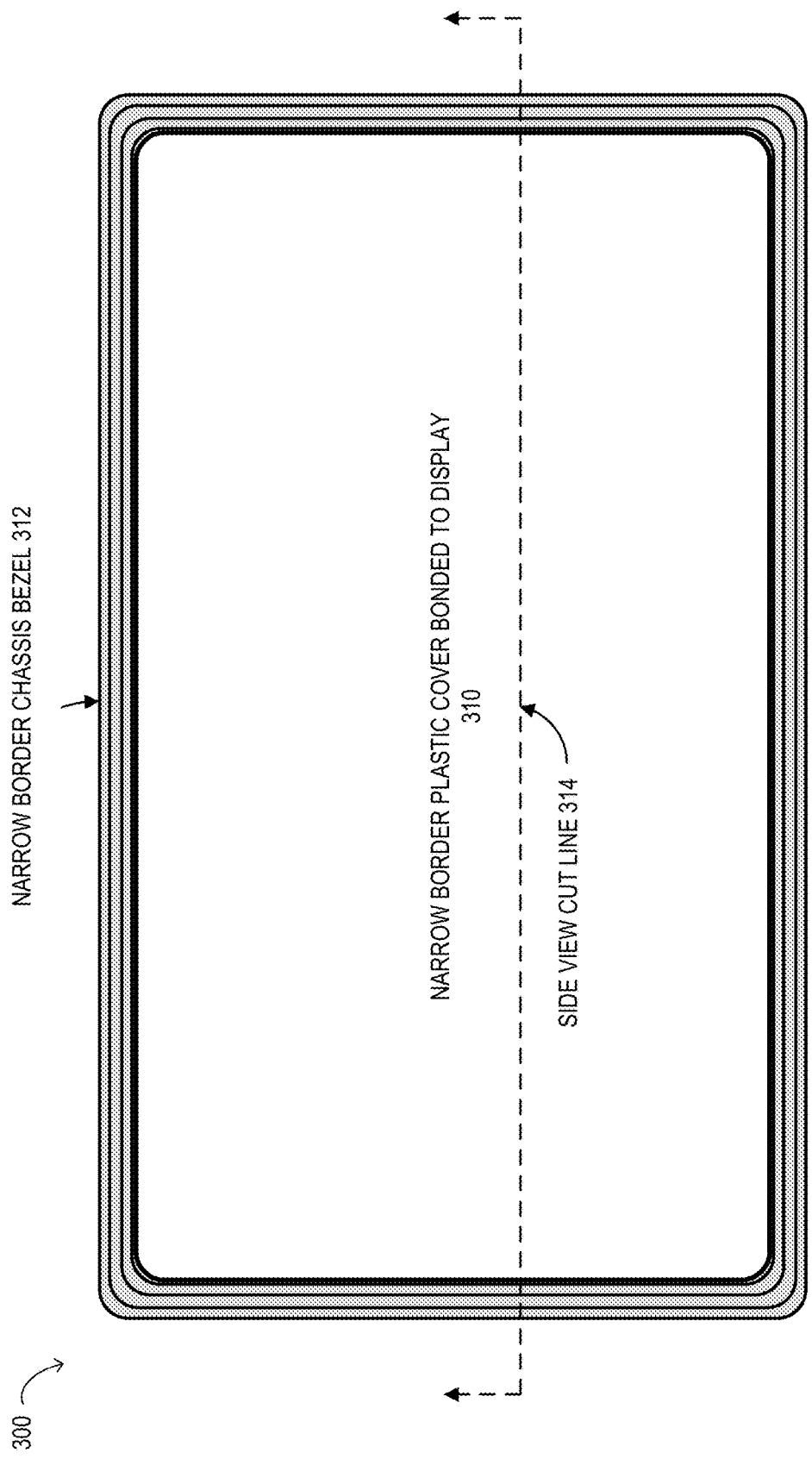
FIG. 3 is a block diagram of selected elements of an embodiment of a narrow border plastic cover bonded to a display.

Turning now to FIG. 3, selected elements of an embodiment of a narrow border plastic cover bonded to a display 310 of an information handling system 300 are illustrated. As shown, narrow border plastic cover bonded to display 310 may represent various embodiments of narrow border plastic covers bonded to various embodiments of displays described herein. A narrow border chassis bezel 312 is attached to narrow border plastic cover bonded to display 310. A side view cut line 314 of narrow border plastic cover bonded to display 310 attached to narrow border chassis bezel 312 is shown, and described in further detail in FIG. 4.

Figure 4:
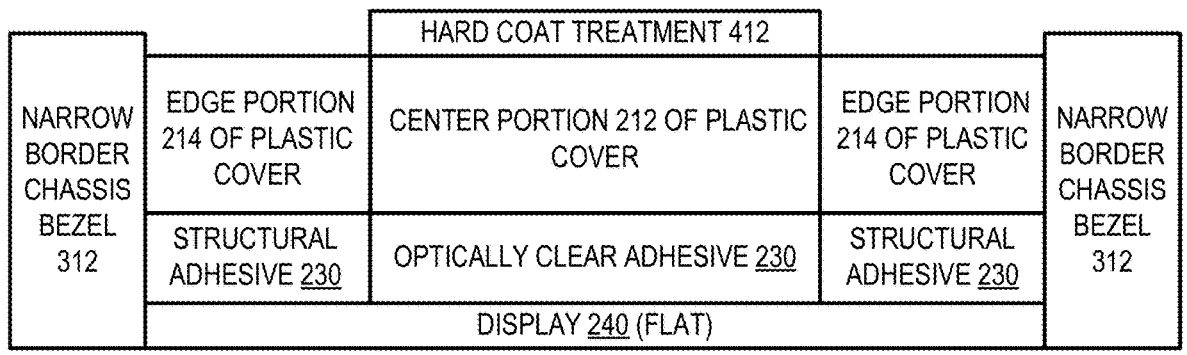
FIG. 4 is are block diagrams of side views of selected elements of embodiments of a narrow border plastic cover bonded to a display.
Figure 4:
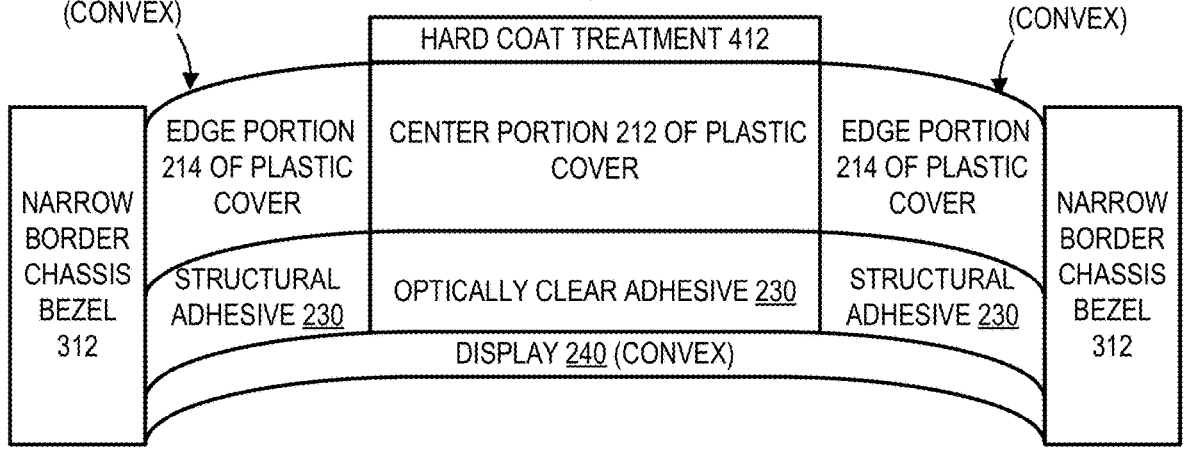
Figure 4:
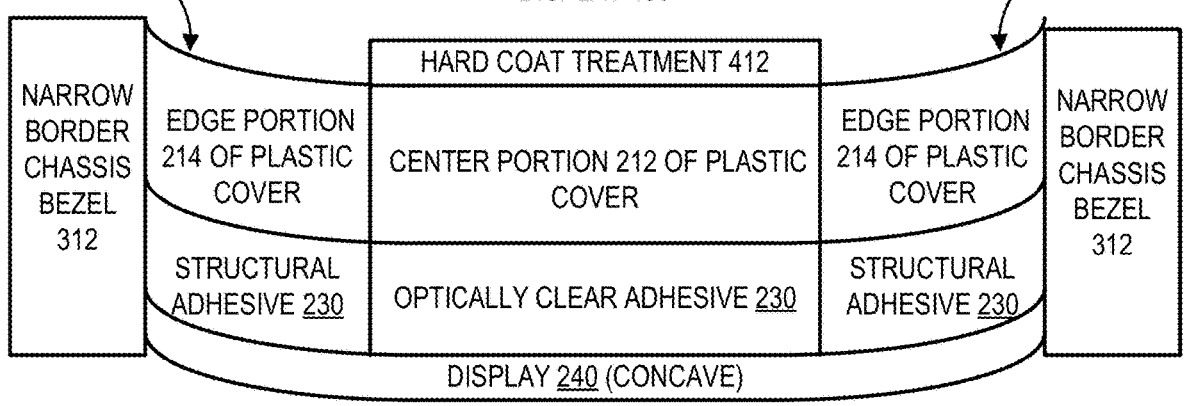

Turning now to FIG. 4, side views of selected elements of embodiments of a narrow border plastic covers bonded to displays are illustrated. As shown, the side views of side view cut line 314 of the narrow border plastic covers bonded to the displays may represent various embodiments of narrow border plastic covers bonded to various embodi-

TABLE 1

| | | | Candidate Material | | | |
|---|---|---|---|---|---|---|
| Property | T.C. | Unit | Mitsubishi DB-D7340 | Mitsubishi DB-D5380 | PC | PMMA |
| Density | | g/cm$^3$ | 1.37 | 1.31 | 1.20 | 1.19 |
| Light Transmission | 3 mm | % | 92 | 92 | 91 | 93 |
| Refractive index | | — | 1.50 | 1.50 | 1.58 | 1.49 |
| Flexural modulus | | MPa | 2800 | 2100 | 2300 | 3300 |
| Charpy impact strength | notch u.n. | kJ/m$^2$ | 9 N.B. | 15 N.B. | 76 N.B. | 1 19 |
| High Deflection Temperature | 1.80 MPa 0.45 MPa | ° C. | 106 118 | 87 96 | 129 143 | 87 — |
| Hardness | Pencil test | — | F | HB | 3B | 2H | ments of displays described herein. The side view of a narrow border plastic cover bonded to display 410 shows a hard coat treatment 412 applied to center portion 212 of the plastic cover, and edge portions 214 of the plastic cover without hard coat treatment. The side view of narrow border plastic cover bonded to display 410 also shows optically clear adhesive 230 applied to the plastic cover, and structural adhesive 230 applied to the edge portions of display 240, where display 240 is a flat display. The side view of narrow border plastic cover bonded to display 410 further shows narrow border chassis bezels 312 attached to display 240. The side view of a narrow border plastic cover bonded to display 420 is similar to the side view of narrow border plastic cover bonded to display 410 and shows convex curved edge portions 214 of the plastic cover. The side view of narrow border plastic cover bonded to display 420 also shows display 240, where display 240 is a convex curved display. The side view of a narrow border plastic cover bonded to display 430 is similar to the side view of narrow border plastic cover bonded to display 420 and shows concave curved edge portions 214 of the plastic cover. The side view of narrow border plastic cover bonded to display 420 also shows display 240, where display 240 is a concave curved display.

Figure 5:
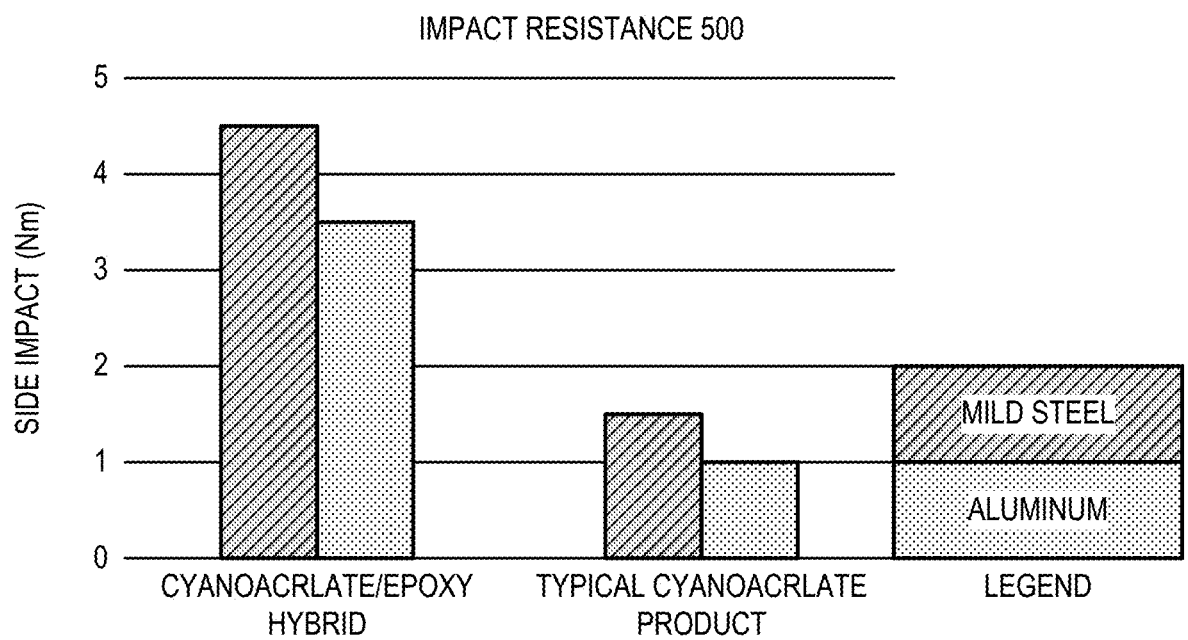
FIG. 5 is a bar graph illustrating impact resistance of embodiments of narrow border plastic covers in an information handling system.

Turning now to FIG. 5, a bar graph of impact resistance 600 of embodiments of narrow border plastic covers in an information handling system are shown. Bar graph of impact resistance shows the improved ability of cynaoacrlate/epoxy materials to absord side impacts over typical cynaoacrlate products, where a mild steel cynaoacrlate/epoxy material absords side impacts better than an aluminum cynaoacrlate/epoxy material, and where a typical mild steel cynaoacrlate material absorbs side impacts better than a typical aluminum cynaoacrlate material.

Turning now to FIG. 6, hardness testing results 600 of embodiments of narrow border plastic covers in an information handling system are shown. Hardness testing results 600 for abrasion tests of the plastic cover of a PMMA polymer material substrate with an anti-glare (AG) hard coat treatment applied and the plastic cover of a PC polymer material substrate with the anti-glare (AG) hard coat treatment applied show only very light scratches in narrow border plastic cover 210 and the best results of the abrasion tests. Hardness testing results 600 for the abrasion tests of the plastic cover of the PMMA polymer material substrate with an epoxy conformal hard coat treatment applied and the plastic cover of the PC polymer material substrate with the epoxy conformal hard coat treatment applied show scratches in narrow border plastic cover 210. Hardness testing results 600 for the abrasion test of the plastic cover of the PMMA polymer material substrate with no hard coat treatment and the plastic cover of the PC polymer material substrate with no hard coat treatment show significant scratches and the worst results of the abrasion tests.

Referring now to FIG. 7, a block diagram of selected elements of an embodiment of method 700 for assembling a narrow border plastic cover for use with a display of an information handling system (such as information handling systems 100) is depicted in flowchart form. It is noted that certain operations described in method 700 may be optional or may be rearranged in different embodiments.

Method 700 may begin at step 702, by applying a hard coat treatment to a center portion of a plastic cover to form a narrow border plastic cover, the plastic cover including the center portion and an edge portion defined therein, the edge portion outside the center portion. At step 704, an optically clear adhesive may be applied to the narrow border plastic cover. At step 706, a structural adhesive may be applied to a second edge portion of the display, the display including a second center portion and the second edge portion defined therein, the second edge portion outside the second center portion. At step 708, the narrow border plastic cover may be bonded to the display.

As disclosed herein, methods for assembling a narrow border plastic cover include defining a center portion and an edge portion of a plastic cover. A hard coat treatment may be applied to the center portion of the plastic cover to improve anti-glare and anti-scratch properties and mechanical strength while retaining the flexibility of the narrow border plastic cover at the edge portion. An optically clear adhesive may be applied to the narrow border plastic cover to improve bond strength and durability. A structural adhesive may be applied to an edge portion of the display to improve mechanical strength at the edge portion of the narrow border plastic cover. The narrow border plastic cover may be bonded to the display to improve the ability of the display to absorb impacts.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of assembling a narrow border plastic cover for use with a display of an information handling system, the method comprising:
    applying a hard coat treatment to a center portion of a plastic cover to form the narrow border plastic cover, the plastic cover including the center portion and an edge portion defined therein, the edge portion outside the center portion;
    applying an optically clear adhesive to the narrow border plastic cover;
    applying a structural adhesive to a second edge portion of the display, the display including a second center portion and the second edge portion defined therein, the second edge portion outside the second center portion; and
    bonding the narrow border plastic cover to the display, wherein the hard coat treatment is spaced-apart a distance from the narrow border chasis bezel about an entirety of the narrow board chassis bezel.

2. The method of claim 1, wherein a narrow border chassis bezel is attached to the display.

3. The method of claim 1, wherein the edge portion of the narrow border plastic cover forms a downward angle from the center portion of the narrow border plastic cover with a measure between 0 degrees and 90 degrees, and wherein the edge portion is curved.

4. The method of claim 1, wherein the edge portion of the narrow border plastic cover forms an upward angle from the center portion of the narrow border plastic cover with a measure between 0 degrees and 90 degrees, and wherein the edge portion is curved.

5. The method of claim 1, wherein the narrow border plastic cover wraps around a side of the display.

6. The method of claim 1, wherein the narrow border plastic cover comprises at least one of:
    a polymethyl methacrylate,
    a polycarbonate, a direct bonded substrate,
a polyamide,
a polybutylene terephthalate,
a polyethylene terephthalate,
a polyethylene naphthalene,
a polyvinylidene fluoride,
a poly 3-cyclohexyl thiophene,
a gelatin.

7. The method of claim 1, wherein the hard coat treatment comprises at least one of an anti-glare coating, and an epoxy conformal coating.

8. The method of claim 1, wherein the display is one of a convex curved display and a concave curved display.

9. The method of claim 1, wherein the display is a liquid crystal monitor, a liquid crystal display, an organic light emitting diode display, and a transparent display.

10. The method of claim 9, wherein a folded portion of the transparent display may be active with pixel with a top portion and a side portion of the transparent display via the narrow border plastic cover.

\* \* \* \* \*